UNITED STATES PATENT OFFICE.

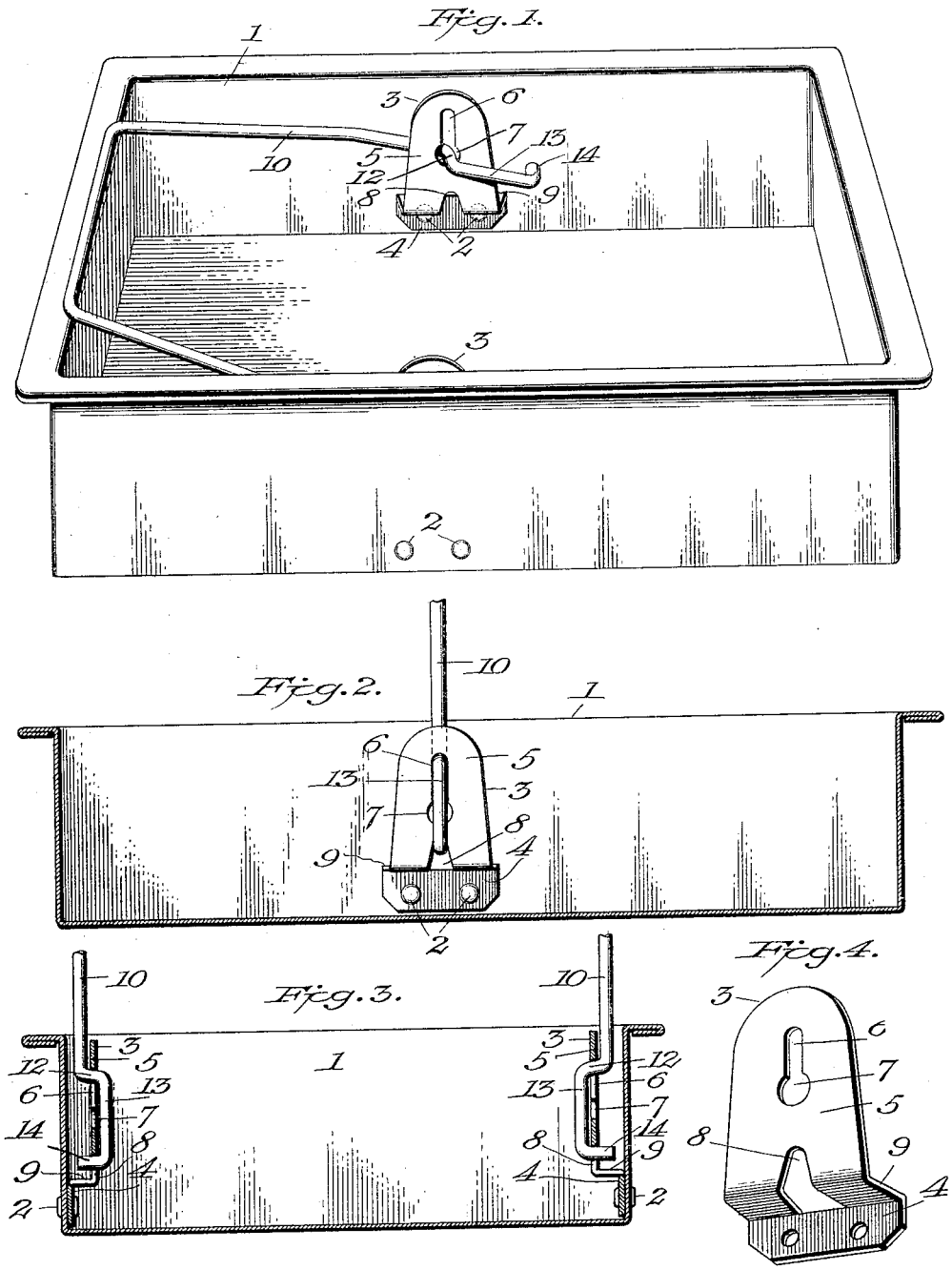

THOMAS H. ROUGHTON, OF MONTE VISTA, COLORADO, ASSIGNOR OF ONE-HALF TO JONATHAN H. SMITH, OF MONTE VISTA, COLORADO.

BAIL AND ATTACHING-EARS FOR PANS.

1,126,658.
Specification of Letters Patent. Patented Jan. 26, 1915.

Application filed November 18, 1913. Serial No. 801,685.

*To all whom it may concern:*

Be it known that I, THOMAS H. ROUGHTON, a citizen of the United States of America, residing at Monte Vista, county of Rio Grande, and State of Colorado, have invented a new and useful Bail and Attaching-Ears for Pans, of which the following is a specification.

My invention relates to an improved rigidly attaching and collapsible combined bail and supporting ear for pans for furnaces, stoves, fire-boxes, and for pans and receptacles for other purposes; and the objects of my invention are: First, to provide a combined bail and supporting ear for ash pans and other receptacles that will permit them to be raised and carried in a substantially horizontal or level non-swinging or tilting position when their contents are either evenly or unevenly distributed in them, so that they will not tilt and spill their contents. Second, to provide a rigid pan carrying but collapsible bail for ash pans and other receptacles that will permit them to be carried in a rigid non-swinging position, and that is swingingly movable or collapsible into such a position of disuse against the pan as to be readily and easily grasped by the hand of an operator whenever it is desired to lift and carry the pan.

I attain these objects by the mechanism illustrated in the accompanying drawings, in which:

Figure 1, is a perspective view of an ash pan equipped with my improved bail and bail-attaching ear, the bail being folded down out of operative position, its handle portion resting on one end of the pan. Fig. 2, is a longitudinal sectional view of the pan, showing the bail in its vertical or operative position, and the contents of the pan either evenly or unevenly distributed in such manner as to prevent tilting of the pan when lifted by the said bail. Fig. 3, is a transverse vertical sectional view through the pan and bail-attaching ears, showing the bail in the same position as in Fig. 2. And Fig. 4, is a perspective view of one of the bail-attaching ears.

Similar letters of reference refer to similar parts throughout the several views.

Referring to the drawings,—the numeral 1 designates an ash pan such as is used in the ash pit portions of furnaces to catch the ashes from the grate of the furnace.

Ash pans have long been used provided with swinging bails. These however permit the pan to tip up, if there is more ashes, and consequently more weight in one end of the pan than in the other end, which is apt to most generally be the case, and permit the ashes to spill out of the pan, and the essential object of my invention is to provide a bail for ash pans that will hold them in in a rigid level or substantially horizontal position regardless of whether the weight of ash contents is evenly or unevenly distributed in them.

In carrying out my invention, I preferably place the bail within the ash pan, as illustrated, and arrange it so that it will swing wholly down inside of the pan when not in operative use in the hand of an operator, with the exception of the hand grasping portion of the bail, which is preferably arranged to rest against the top edge of the adjacent end of the pan, and the ears are preferably positioned closer to one end of the pan than to the other in order to allow the bail to rest on the top or nearest end when it is swung down into a position of disuse, and the end of the pan the bail rests on naturally becomes the front end of the pan when inserting it in the ash pit of a furnace. The bail and its supporting ears can however be positioned on the outside of the opposite sides of the ash pan, if desired.

In carrying out the preferred construction and arrangement of my invention, I arrange the bail and ears in the following manner: To the inside surface of the opposite sides of an ash pan 1, I secure by any suitable means, preferably by rivets 2, which extend through them and the sides of the pan, a pair of bail supporting ear clips 3. These bail supporting ear clips are thin strips of metal, preferably sheet iron, the lower end portion of each of which is bent into a right angled offset portion 4, which is riveted against the side of the pan, and this right angled offset portion causes the upper end portion 5 of these clips to stand at a sufficient distance away from the adjacent sides of the pan to permit the inner end portions of a wire bail to swing loosely between the upper ends of the ears and the adjacent sides of the pan.

The upper ends of the ears are provided with vertical slots 6, the lower ends of which extend into a round aperture 7, which forms the pivotal aperture of the bail in the ears, and the slot, and these pivotal apertures are made enough larger in diameter than the bail to allow the ends of the bail to move loosely in them.

The lower portion of the vertical members 5 of each ear is also provided with a bail receiving slot 8, which is in alinement with the vertical slot 6, and also extends into the horizontal portions 9 of the ears, thus forming L-shaped slots which are partly in the vertical members 5 and partly in the horizontal bends 9 of the ears. To these ears I attach a bail 10, which comprises a single piece of substantially U-shaped wire, the closed end 11 of which is straightened into a hand grasping portion. The free or inner ends of this bail, extend between the ears and the sides of the pan, to the round pivotal apertures 7, of the ears, where they are bent inward to form a short right angled portion 12, that extends loosely through the pivotal apertures 7, and beyond these bends 12, the ends are again bent at right angles to the bends 12, and in line with the sides of the bail to form short straight portions 13, which extend below the horizontal bends 9 of the ears, and terminate in short outwardly bent right angled ends, which form hooks 14, which are arranged to engage the upper ends of the vertical slots 8, when the bail is swung up into a vertical operative position, as will be presently described, the portions 13 of the bail extending far enough beyond the bail's pivotal aperture 7, to permit its hooks 14 to swing clear of the horizontal bend of the clip when the bail is raised and swung up from its position of rest against the end of the pan to its vertical position of use, and its extreme or hooked ends are raised up through the horizontal portion of the slot 8, and into the vertical portion thereof, in which position it is held rigidly against swinging pivotal movement in either direction and holds the pan in a rigid substantially level and horizontal position when the handle of the bail is grasped by an operator.

The operation of my improved bail and its coöperating ears, is as follows: The bail normally rests on the top edge of the nearest end of the pan, it being made of a length to extend there from the ears, and the pan is inserted in the ash pit of the furnace with the bail swung down at rest on the edge of the pan where it is handy. Then when it is desired to remove the pan from the ash pit, the operator can take hold of the handle part of the bail, draw the pan toward him, and swing the bail upward into its vertical position, and raise it up in its slot until its terminal ends enter the notches when the bail is locked to the ears in its right angled position to the pan, and the pan is locked to it rigidly against pivotal or tilting action, and when the bail is thus locked in its ears, the pan is held when carried by the bail in a level or substantially level position, and cannot tilt and spill out the ashes.

My invention is also applicable to dishes and receptacles for material or liquids that it is desired to carry by a rigid bail or handle, and at the same time require a collapsible bail or handle that can be lowered substantially or wholly level with the pan, as it can be readily seen that the bail can be made short enough to swing down wholly within the pan if desired, but it is handier to loosely grasp if it is arranged to swing down on top of the end of the pan.

Having described my invention, what I claim as new and desire to secure by Letters Patent, is:

1. The combination with a pan, of a pair of bail attaching ears, comprising plates secured at their lower end to the pan, and being inwardly and upwardly bent above the securing points to form L-shaped members, the vertical portions of which have slots in their lower ends which extend into the inwardly bent portions, and slots above and in line with the first-mentioned slots and a bail bent near its lower ends to form abrupt shoulders which lie in the latter slots and parts which lie parallel with the inner faces of said vertical portions and terminate in outwardly turned hooks which pass through the slots in the lower ends of the vertical portions, said bail being slidable in said upper slots.

2. The combination with a pan, of ears secured thereto having upper and lower slots in line, the lower ends of said ears having horizontal bends through which said lower slots extend, and a bail having hooked ends which extend through said lower slots, and shoulder portions which extend through said upper slots, said shoulder portions being slidable in the upper slots.

3. The combination with a pan of ears secured thereto, which are bent above their attached portions to form short horizontal portions and relatively long vertical portions, said vertical portions having vertical slots near their upper ends and slots which are formed partly in their lower ends and partly in the horizontal portions, and a bail, the ends of which are bent to form offset portions, which terminate in hooked ends, 5 shoulders being formed at the junction of the offset portions, and main portions of the bail, which are slidably mounted in the vertical slots in the upper portions of the ears, the hooked end being adapted to engage in the upper ends of the lower slots, when said bail is in position for use.

In testimony whereof I affix my signature in presence of two witnesses.

THOMAS H. ROUGHTON.

Witnesses:
JONATHAN H. SMITH,
LULU T. SOUTHWORTH.